United States Patent [19]

Futami

[11] 4,215,998

[45] Aug. 5, 1980

[54] CATALYST AND PROCESS FOR PRODUCTION OF METHANE-CONTAINING GASES

[76] Inventor: Hideo Futami, No. 3306-631, Isogo Apartment, 3, 3-chome, Shiomidai, Isogo-ku, Yokohama-shi, Kanagawa-ken, Japan

[21] Appl. No.: 953,218

[22] Filed: Oct. 20, 1978

Related U.S. Application Data

[63] Continuation-in-part of Ser. No. 829,489, Aug. 31, 1977, abandoned.

[51] Int. Cl.$^2$ .......................... C07C 3/34; B01J 21/04
[52] U.S. Cl. .................................... 48/214 A; 48/213; 252/462
[58] Field of Search .............. 48/213, 214 A; 252/462

[56] References Cited

U.S. PATENT DOCUMENTS

| | | | |
|---|---|---|---|
| 2,449,295 | 9/1948 | Gutzeit | 252/466 J |
| 2,759,805 | 8/1956 | Erickson et al. | 48/214 A |
| 3,404,100 | 10/1968 | Taylor et al. | 48/214 A |
| 3,650,713 | 3/1972 | Chinchen et al. | 252/462 |
| 3,839,225 | 10/1974 | Acres | 252/462 |

*Primary Examiner*—S. Leon Bashore
*Assistant Examiner*—Peter F. Kratz
*Attorney, Agent, or Firm*—Carroll F. Palmer

[57] ABSTRACT

A catalyst for production of methane-containing gases which is formed from a catalyst precursor composed of a mixed precipitate of hydroxides and/or carbonates of nickel and/or cobalt, lanthanum and/or cerium and aluminum, which is obtained by stepwise addition of solutions of alkaline substances to a solution of an aluminum salt, to a solution of a lanthanum salt and/or a cerium salt and to a nickel salt and/or a cobalt salt is disclosed. This stepwise addition of solutions of alkaline substances is accomplished by (1) first stage addition of a solution of an alkaline substance to a solution of an aluminum salt, (2) second stage addition of a solution of an alkaline substance to a solution of a lanthanum salt and/or a cerium salt in the presence of the precipitate-containing solution formed by the first stage addition and (3) third stage addition of a solution of an alkaline substance to a solution of a nickel salt and/or a cobalt salt in the presence of the precipitate-containing solution formed by the second stage addition.

13 Claims, No Drawings

CATALYST AND PROCESS FOR PRODUCTION OF METHANE-CONTAINING GASES

CROSS-REFERENCE TO RELATED APPLICATION

This application is a continuation-in-part of copending application Ser. No. 829,489, filed Aug. 31, 1977 now abandoned.

BACKGROUND OF THE INVENTION

1. Field of the Invention

The present invention relates to a catalyst for use in the production of a gas containing methane as the main component by catalytic reaction of a hydrocarbon having 2 to 12 carbon atoms with steam. More particularly, the present invention relates to an improved ternary catalyst comprising nickel and/or cobalt, lanthanum and/or cerium and aluminum.

2. Description of the Prior Art

A gas containing methane as the main component is important as an energy source causing no pollution and is valuable as a fuel gas or city gas. In addition to natural gas, there is known substitute natural gas (hereinafter referred to as "SNG") which contains methane as the main component. A most popular process commercially adopted for the production of SNG is a so-called low-temperature steam-reforming process which comprises catalytically reacting a light petroleum distillate (naphtha composed mainly of paraffinic hydrocarbons) with steam at a relatively low temperature. As typical instances of this reforming process, there can be mentioned a CRG process (catalytic rich gas process) of British Gas Corporation (cf. U.S. Pat. Nos. 3,415,634 and 3,420,642), an MRG process (methane rich gas process) of Japan Gasoline Co. (cf. U.S. Pat. No. 3,429,680) and a Gasynthan process of BASF-LURGI (cf. Japanese Patent Application Laid-Open Specifications No. 52801/74 and No. 52802/74).

In these low-temperature steam-reforming processes, a hydrocarbon is reacted with steam at 300° to 550° C. in the presence of a nickel catalyst. As the nickel catalyst, there can be mentioned a nickel-alumina catalyst, a nickel-silica catalyst, a nickel-magnesia catalyst, a catalyst formed by incorporating Cu, Cr and Mn into nickel-alumina and a catalyst formed by incorporating La and Ce as promoters into nickel-alumina. Among these catalysts, nickel-alumina catalysts are used most frequently.

Nickel-alumina catalysts take a form of $NiO-Al_2O_3$ when prepared, but the form is converted to $Ni-Al_2O_3$ prior to the reaction because NiO is reduced to Ni in a reactor. The activity and durability of the catalysts generally depends on the preparation conditions and methods, and it is usually difficult to produce a catalyst with high activity consistently.

SUMMARY OF THE INVENTION

I have investigated the conditions for production of catalysts, and found that the catalyst activity depends mainly on conditions for formation of hydroxides and carbonates of nickel, aluminum and the like. I furthered my research works and investigations based on this finding and have now completed an improved ternary catalyst comprising nickel (and/or cobalt), lanthanum (and/or cerium) and aluminum.

While I continued the research works and investigations, I found that one factor having great influence on the activity of a nickel-alumina catalyst as mentioned above is the degree of the intimacy (the meaning of "intimacy" will be apparent from the description given hereinafter) between the nickel and aluminum components when the catalyst is formed from a mixed precipitate prepared from solutions of nickel and aluminum salts.

I prepared mixed precipitates of nickel and aluminum components differing in the degree of the intimacy between the two components according to the following three processes, and $NiO-Al_2O_3$ catalysts were then prepared from these mixed precipitates according to a customary method.

(A) Catalysts by Coprecipitation:

A mixed solution of nickel nitrate and aluminum nitrate was prepared, and a solution of potassium carbonate was added dropwise to the mixed solution until the pH was elevated to 7, to obtain a coprecipitate of nickel and aluminum components. The precipitate was washed with water, dried, pulverized, molded into tablets and calcined to form an $NiO-Al_2O_3$ catalyst.

(B) Catalyst by Intimate Coprecipitation:

A mixed solution of nickel nitrate and aluminum nitrate and a solution of potassium carbonate were simultaneously added dropwise into a precipitation vessel while adjusting the pH of the solution in the precipitation vessel to 6.5 to 7.5, to form a mixed precipitate of nickel and aluminum components. The precipitate was subjected to the same treatments as described in (A) above.

(C) Catalyst by Two-Staged Precipitation:

A solution of potassium carbonate was added dropwise to a solution of aluminum nitrate to precipitate aluminum hydroxide, and a solution of nickel nitrate was added to the precipitate-containing solution and a solution of potassium carbonate was further added dropwise. The resulting mixed precipitate was subjected to the same treatments as described in (A) above. The degree of the "intimacy" between nickel and aluminum components is different among the mixed precipitates prepared according to the foregoing three methods.

In general, when a solution of an alkaline substance is added dropwise to a solution of an aluminum salt or nickel salt to elevate the pH of the mixed solution, the aluminum salt is precipitated at a lower pH than the nickel salt. Although such precipitation pH is changed depending on the concentration of the solution, the aluminum salt forms a precipitate at a pH of 3 to 4.5 and the nickel salt forms a precipitate at pH of 5 to 6.5 at room temperature. Therefore, according to the above-mentioned method (A) comprising adding a solution of potassium carbonate dropwise to a mixed solution of nickel salt and an aluminum salt, a precipitate of a hydroxide of aluminum is first formed and an hydroxide and/or a carbonate of nickel is then formed. However, in the practical operation, since the potassium carbonate solution is added in the form of a drop having a finite size, the pH is locally elevated in the mixed solution of the nickel and aluminum salts, and precipitates of the nickel and aluminum components are simultaneously formed.

In the method (B), since a mixed solution of a nickel salt and an aluminum salt is added dropwise to a solution whose pH is maintained in such a range that both the two components are precipitated, both the nickel and aluminum components are precipitated simultaneously. Accordingly, it is considered that the degree of the intimacy between the two components in the resulting mixed precipitate is higher than in the mixed precipitate formed in the method (A).

In the method (C), after a hydroxide of aluminum has been completely precipitated, an hydroxide and/or a carbonate of nickel is precipitated. Accordingly, it is considered that a mixed precipitate in which the former precipitate is coated with the latter precipitate is formed.

Thus, it is believed that the order of the degree of the intimacy between the nickel and aluminum components among the mixed precipitates prepared according to the foregoing three methods is as follows:

(B)>(A)>(C)

This supposition was fully supported by the following experiment.

Each of the catalysts prepared by the foregoing methods (A) to (C) (each being a mixture of NiO and $Al_2O_3$) was calcined at a high temperature (for 2 hours at 1000° C.) to form nickel aluminate ($NiAl_2O_4$). The resulting calcination product was subjected to the X-ray diffractometry analysis to determine the peak height of nickel aluminate formed. As a result, it was found that the order of the peak height among the three calcination products was as follows:

(B)>(A)>(C)

Each of the so prepared catalysts was applied to the low-temperature steam-reforming reaction according to the present invention and the activity was determined (under the same reaction conditions are described in Example 1). As a result, it was found that the order of the activity among the three catalysts was as follows:

(C)>(A)>(B)

In view of the foregoing, it may be concluded that in $NiO-Al_2O_3$ catalysts the activity is higher as the degree of the intimacy between the nickel and aluminum components is lower in the mixed precipitate, and that the activity is highest when the catalyst has such a form that the nickel component precipitate covers the aluminum component precipitate. It is construed that one of reasons why the catalyst formed according to the method (B) has a lowest activity is that NiO in the catalyst easily forms Ni-Aluminate and is not reduced easily because of intimate mixture of NiO and $Al_2O_3$.

I intended to improve the catalyst for production of methane-containing gases based on the foregoing findings.

DESCRIPTION OF THE PREFERRED EMBODIMENTS

In view of the fact that the catalyst prepared by the above-mentioned stepwise precipitation method (C) has a higher activity than the catalysts prepared by other precipitation methods, I applied this stepwise precipitation technique to preparation of a ternary catalyst comprising the above mentioned two components, i.e., the component of Ni and/or Co and the component of Al, and an additional component of La and/or Ce. More specifically, I prepared a catalyst precursor of the three components by the stepwise precipitation technique, and the precursor was subjected to customary post treatments to form a ternary catalyst comprising oxides of Ni and/or Co, La and/or Ce and Al. As a result, it was confirmed that in the catalyst prepared by the stepwise precipitation of the three components, the catalytic activity can be remarkably enhanced by incorporation of La and/or Ce, and the component of La and/or Ce not only acts as a promoter but also has an effect of preventing the carbon deposition during the above-mentioned reaction of forming a methane-containing gas. Based on this novel finding, I have now completed the present invention.

With respect to catalytic activity, nickel and cobalt exhibit substantially the same effect. Similarly, lanthanum and cerium exhibit substantially the same effect. Therefore, "nickel and/or cobalt" and "lanthanum and/or cerium" will be referred to hereinafter as "nickel" and "lanthanum", respectively.

The nickel-lanthanum-aluminum catalyst of the present invention is superior to a nickel-aluminum catalyst with respect to the activity and durability, and when this catalyst of the present invention is employed, the reaction can be completed at a lower steam/hydrocarbon ratio. It is considered that this advantage is due to the fact that the carbon deposition is considerably reduced by the presence of lanthanum during the low-temperature steam-reforming reaction. Further, it is construed that since the formation of nickel aluminate is suppressed in the catalyst prepared according to the three-staged precipitation operation of the present invention, especially good results can be obtained.

Various methods such as mentioned below may be adopted for obtaining a precursor of a nickel-lanthanum-aluminum catalyst.

(1) A solution of an alkaline substance is added dropwise to a mixed solution of salts of nickel, lanthanum and aluminum to form a mixed precipitate of the three components.

(2) A solution of an alkaline substance is added dropwise to a mixed solution of a nickel salt and an aluminum salt to obtain a mixed precipitate of the nickel and aluminum components, the precipitate is washed with water and a lanthanum compound is added to the washed precipitate (cf. U.S. Pat. No. 3,404,100).

(3) A solution of an alkaline substance is added dropwise to a solution of an aluminum salt to precipitate the aluminum component, and a mixed solution of a nickel salt and a lanthanum salt is added to the precipitate-containing solution and a solution of an alkaline substance is further added to the mixed solution to form a mixed precipitate of the three components.

(4) A solution of an alkaline substance is added dropwise to a mixed solution of an aluminum salt and a lanthanum salt to form a mixed precipitate of the aluminum and lanthanum components, and a solution of a nickel salt is added to the precipitate-containing solution and a solution of an alkaline substance is further added dropwise to the mixture to form a mixed precipitate of the three components.

(5) A solution of an alkaline substance is added dropwise to a solution of an aluminum salt to form a precipitate of the aluminum component, and a solution of a lanthanum salt is added to the precipitate-containing solution and a solution of an alkaline substance is further added dropwise to form a precipitate of the lanthanum component. Then, a solution of a nickel salt and a solution of an alkaline substance are added to the precipitate-containing solution to form a precipitate of the nickel component. Thus, a mixed precipitate of the three components is obtained. (This method will be called "three-staged precipitation method" hereinafter).

I prepared catalysts by subjecting the so prepared catalyst precursors to water washing, drying, pulverization, tablet molding and calcination, and applied them to the reaction of forming a methane-containing gas to examine activities of these catalysts. As a result, it was found that the catalyst from the precursor obtained by the three-staged precipitation method (5) exhibited the highest activity among the foregoing catalysts.

The process for preparing the catalyst of the present invention will now be described in detail.

An aluminum salt, preferably aluminum nitrate, is dissolved in deionized water or distilled water. A solution of an alkaline substance, for example, sodium hydroxide, potassium hydroxide, potassium carbonate or sodium carbonate or aqueous ammonia is added dropwise to the solution of the aluminum salt under agitation to precipitate the aluminum component completely. At this step, the final pH is adjusted to about 4.5 to about 7.

Then, a lanthanum salt, preferably lanthanum nitrate, and/or a cerium salt, preferably cerium nitrate, is added to the above precipitate-containing solution, and a solution of an alkaline substance such as mentioned above is added dropwise to the solution under agitation to precipitate the lanthanum component and/or the cerium component completely. At this step, the final pH is adjusted above 6.

A nickel salt, preferably nickel nitrate, and/or a cobalt salt, preferably cobalt nitrate, is added to the above mixed precipitate-containing solution, and a solution of an alkaline substance such as mentioned above is added dropwise to the solution under agitation to precipitate the nickel component and/or the cobalt component completely. At this step, the final pH is adjusted to between 7 to 10.

At the third stage precipitation operation, namely at the step of precipitating the nickel component and/or the cobalt component, when a solution of a nickel salt and/or a cobalt salt is added to the solution containing precipitates formed at the preceding stages, care must be taken so that re-dissolution of the precipitate of the lanthanum component and/or the cerium component by lowering the pH in the solution is prevented. In view of the foregoing, it is preferred that a solution of a nickel salt and/or a cobalt salt and a solution of an alkaline substance be added simultaneously while adjusting the pH of the solution to a range 6 to 10.

In each of the foregoing precipitation operations, the temperature of the solution is maintained in the range of from room temperature to 100° C. The higher operation temperature is preferred, because solubilities of the respective salts are enhanced.

The resulting mixed precipitate is washed sufficiently with water, and when compounds of sodium and potassium are employed as the alkaline substance, water washing is conducted so that the content of such alkaline substance component is below 0.5% by weight. The washed precipitate is then filtered to obtain a cake-like precipitate.

The so-prepared cake-like precipitate is formed into a catalyst according to a customary method. For example, the precipitate is dried at 100° to 400° C. and pulverized. Then, graphite is added to the pulverized product, and the mixture is molded into tablets. Finally, the tablets are calcined at 300° to 600° C. to obtain a final product catalyst. When the pulverized product is a powder having too low a density and tablet molding is difficult, the powder is granulated by extrusion molding or rolling granulation to increase the density of the powder. In another example to prepare the catalyst, the precipitate is kneaded with a kneader under heating to reduce the water content, molded by an extrusion granulator and calcined at 300° to 600° C. to obtain a final product catalyst.

The so obtained catalyst contains the respective components in the form of oxides, such as NiO, CoO, $La_2O_3$, $CeO_2$ and $Al_2O_3$. As usually employed in the art, before the catalyst is used for the reaction to produce a methane-containing gas, it is subjected to the reducing treatment to convert nickel and cobalt oxides in the catalyst to metallic nickel and metallic cobalt, respectively. The reducing treatment is carried out in a hydrogen-containing gas under a pressure of 1 to 100 atmospheres at 300° to 600° C. for several hours to several days. If the temperature is lower than 300° C., a sufficient reducing effect cannot be obtained, and if the temperature is higher than 600° C., the activity of the catalyst is lowered.

The catalyst of the present invention comprises 50–95%, preferably 60 to 90% by weight of NiO and/or CoO, 1–49%, preferably 2 to 15% by weight of $La_2O_3$ and/or $CeO_2$ and the balance by weight of $Al_2O_3$. When the composition of the catalyst is outside this range, the catalyst activity is insufficient and satisfactory results are not obtained.

In order to produce a methane-containing gas using the catalyst of the present invention, a mixture of hydrocarbon and steam is contacted with the catalyst at 300° to 600° C. In general, the feed hydrocarbon to be subjected to this reaction has been passed through the hydrodesulfurization process. Accordingly, a hydrogen-containing gas used for this hydrodesulfurization is also present in the intended steam-reforming reaction. When the reaction temperature is lower than 300° C., the catalyst activity is low and the catalyst degradation speed is high. When the reaction temperature is higher than 600° C., sintering of the catalyst is readily caused.

The steam/hydrocarbon weight ratio is in the range of from 0.6 to 3.0, through this ratio is varied to some extent depending on the kind of the hydrocarbon. When a light hydrocarbon feedstock such as ethane, propane or butane is used, the steam/hydrocarbon ratio can be lowered to 0.6. For a heavier hydrocarbon, for example naphtha having a final boiling point of 110°–170° C., the minimum steam/hydrocarbon ratio is about 0.9. If the ratio is lower than the minimum value, carbon is deposited on the catalyst layer and a stable operation of the reactor is not expected. If the ratio is higher than 3.0, the thermal efficiency is lowered and the methane concentration in the resulting gas is low. Accordingly, in each case, no satisfactory results can be obtained. The reaction pressure is about 1 to 100 atmospheres, preferably at least 5 atmospheres.

In the present invention, the hydrocarbon feed stock to be subjected to the steam-reforming reaction is limited to the hydrocarbon having 2 to 12 carbon atoms. If the hydrocarbon has more than 12 carbon atoms, the catalyst is promptly degraded and the practical operation is difficult. Since sulfur contained in the starting hydrocarbon generally degrades the catalyst, it is preferred that sulfur be removed as completely as possible prior to the steam reforming reaction.

The type of the reactor is not particularly critical in the present invention, and any of reactors of the fixed bed, moving bed and fluidized bed types can be used. In view of the fact that the intended reaction is an exothermic reaction and heat need not be supplied externally, it is preferred to use an adiabatic reactor of the fixed bed type.

The present invention will now be described more specifically by reference to the following examples.

EXAMPLE 1

In 1 l of distilled water 736 g of aluminum nitrate was dissolved to form a solution A, 133 g of lanthanum nitrate was dissolved in 0.3 l of distilled water to form a solution B, and 1364 g of nickel nitrate was dissolved in 1 l of distilled water to form a solution C. A solution of potassium carbonate was added dropwise to the solution A under agitation to elevate the pH to 6 and precipitate the aluminum component. Then, the solution B was added to the solution containing the precipitate of the aluminum component, and a solution of potassium carbonate was added dropwise to the mixed solution to elevate the pH to 8. Then, the solution C and a solution of potassium carbonate were simultaneously added dropwise to the resulting solution containing the precipitates of the lanthanum and aluminum components while adjusting the pH to a range of 6.5 to 8. After completion of the dropwise addition of the solution C, the pH was adjusted to 8 by addition of a solution of potassium carbonate. The foregoing three-staged precipitation operation was carried out at 70°±10° C.

The so obtained mixed precipitate of the nickel, lanthanum and aluminum components was washed sufficiently with distilled water and then filtered. The resulting cake-like precipitate was dried at 110° to 130° C. for 8 hours, pulverized to a size not larger than 32 mesh and molded into columns having a diameter of 6 mm and a length of 6 mm. Then, the molded product was calcined at 450° C. for 2 hours to form a final product catalyst. The so formed catalyst comprised 70% by weight of NiO, 10% by weight of $La_2O_3$ and 20% by weight of $Al_2O_3$.

EXAMPLES 2 to 5

Catalysts having compositions indicated below were prepared in the same manner as described in Example 1 except that the amounts used of the nickel, lanthanum and aluminum salts were changed so as to attain the intended composition.

| Example No. | $NiO:La_2O_3:Al_2O_3$ (Weight ratio) |
|---|---|
| 2 | 90 : 5 : 5 |
| 3 | 80 : 5 : 15 |
| 4 | 70 : 5 : 25 |
| 5 | 60 : 10 : 30 |

Comparative Example 1

In 2.3 l of water 736 g of aluminum nitrate, 133 g of lanthanum nitrate and 1364 g of nickel nitrate were dissolved, and a solution of potassium carbonate was added dropwise to the so formed solution under agitation to elevate the pH to 8 and obtain a mixed precipitate of the nickel, lanthanum and aluminum components. The precipitate was subjected to the same post treatments as described in Example 1 to obtain a final product catalyst.

Comparative Example 2

In 2 l of water 736 g of aluminum nitrate and 1364 g of nickel nitrate were dissolved, and a solution of potassium carbonate was added dropwise to the so formed solution under agitation to elevate the pH to 8 and obtain a mixed precipitate of the nickel and aluminum components. The precipitate was washed with water and filtered, and a solution of 133 g of lanthanum nitrate in 0.3 l of water was added to the filtered precipitate, and the mixture was kneaded sufficiently by a kneader. The kneaded mixture was subjected to the same drying and subsequent post treatments as described in Example 1 to obtain a final product catalyst.

Comparative Example 3

A solution of potassium carbonate was added dropwise to a solution of 736 g of aluminum nitrate in 1 l of water to elevate the pH to 7 and precipitate the aluminum component. A solution of 133 g of lanthanum nitrate and 1364 g of nickel nitrate was added to the precipitate-containing solution. Then, a solution of potassium carbonate was added dropwise to the above solution to elevate the pH to 8. The resulting precipitate was subjected to the same post treatments as described in Example 1 to obtain a final product catalyst.

Comparative Example 4

In 1.3 l of water 736 g of aluminum nitrate and 133 g of lanthanum nitrate were dissolved, and a solution of potassium carbonate was added dropwise to the so formed solution to elevate the pH to 7 and precipitate the aluminum and lanthanum components. Then, a solution of 1364 g of nickel nitrate in 1 l of water was added to the precipitate-containing solution, and a solution of potassium carbonate was added to the solution to elevate the pH to 8. The resulting precipitate was subjected to the same post treatments as described in Example 1 to obtain a final product catalyst.

Comparative Example 5

In 3 l of water 1650 g of aluminum nitrate and 2030 g of nickel nitrate were dissolved, and a solution of potassium carbonate was added dropwise to the so formed solution to elevate the pH to 8 and obtain a mixed precipitate of the nickel and aluminum components. The precipitate was subjected to the same post treatments as described in Example 1 to obtain a final product catalyst comprising 70% by weight of NiO and 30% by weight of $Al_2O_3$.

Comparative Examples 6 and 7

Catalysts having a composition indicated below were prepared in the same manner as described in Example 1 except that the amounts of the nickel, lanthanum and aluminum salts were changed so as to attain the intended composition.

| Comparative Example No. | $NiO:La_2O_3:Al_2O_3$ (weight ratio) |
|---|---|
| 6 | 40 : 10 : 50 |
| 7 | 20 : 10 : 70 |

Activities of the catalysts prepared in the foregoing examples were tested according to the following performance tests.

Performance Test 1

A high-pressure flow type reactor was employed, and by using pulseless pumps, a hydrocarbon (naphtha) and water were separately introduced into a preheating zone. Further, hydrogen was introduced into the preheating zone from a pressure vessel. A preheater was composed of a stainless steel pipe having a diameter of about 20 mm, and it was externally heated by an electric furnace. After the preheating, naphtha, water and hydrogen were introduced into a reaction tube having an outer diameter of 6.4 mm, an inner diameter of 4.6 mm and a length of about 600 mm. A catalyst pulverized to 8 to 16 mesh in an amount of 2 cc was packed into the central portion of the reaction tube. In order to perform the reaction adiabatically, the reaction tube was wrapped in a thickness of about 6 cm by an alumina cloth and the reaction tube was maintained at a prescribed temperature by an electric furnace. The product gas coming from the reaction tube was cooled to separate water therefrom, and the gas was then passed through a pressure regulator and was analyzed by using a gas chromatograph. Since this reaction is an exothermic reaction, if the reaction is carried out adiabatically, nonuniform temperature distribution is caused in the catalyst layer. Accordingly, if the temperature distribution is determined, the reaction zone (the distance between the inlet of the catalyst layer and the maximum temperature portion, i.e., the point of completion of the reaction) can be known. As the catalyst is degraded, the reaction zone is gradually shifted toward the outlet. In the case of a catalyst having a high activity, this reaction zone is short, and the moving speed of the reaction zone is low.

Conditions adopted were as follows:
Reaction pressure: 25 atmospheres
Inlet temperature of catalyst layer: 450° C.
Feed rate of naphtha (final boiling point 90° C.): 84 g/hr
Mass velocity of feed naphtha: 1000 lb/(ft)$^2$.hr
Steam/naphtha: 2.0 (weight ratio)
H$_2$/C ratio: 0.05 (mol/atom)

The experiment was carried out under the foregoing conditions and the temperature distribution in the catalyst layer was measured to determine the point of completion of the reaction and the moving speed of the point of completion of the reaction (namely, the degradation speed of the catalyst). The catalysts obtained in Examples 1 to 5 and Comparative Examples 1 to 7 were tested to obtain results shown in Table 1.

Table 1

|  | Experiment Conditions | Length (cm) of Reaction Zone after 1 hour | after 10 hours | Degradation Speed (mm/hr) of Catalyst |
|---|---|---|---|---|
| Example 1 | same as in Capacity Test 1 | 2.5 | 3.3 | 0.9 |
| Example 2 | " | 3.0 | 4.0 | 1.1 |
| Example 3 | " | 2.5 | 3.2 | 0.8 |
| Example 4 | " | 2.7 | 3.5 | 0.9 |
| Example 5 | " | 3.1 | 4.0 | 1.0 |
| Comparative Example 1 | " | 3.4 | 4.9 | 1.7 |
| Comparative Example 2 | " | 4.5 | 6.3 | 2.0 |
| Comparative Example 3 | " | 3.8 | 5.4 | 1.8 |
| Comparative Example 4 | " | 3.3 | 4.6 | 1.4 |
| Comparative Example 5 | " | 4.2 | 6.2 | 2.2 |
| Comparative Example 6 | " | 5.2 | 6.5 | 1.4 |
| Comparative Example 7 | " | 10.3 | 33.0 | 25.2 |

Performance Test 2

Catalysts prepared in Example 1, Comparative Example 2 and Comparative Example 5 were tested in the same manner as described in Performance Test 1 except that the steam/naphtha ratio was changed to 1.6, 1.3 or 1.1 (weight ratio), and the increase of the pressure difference in the catalyst layer by deposit of carbon in the catalyst layer was examined.

In case of the catalyst of Comparative Example 5, at a steam/naphtha ratio of 1.3, increase of the pressure difference by deposit of carbon was observed 1 hour after the start of the reaction, and in case of the catalyst of Comparative Example 2, at a steam/naphtha ratio of 1.3 increase of the pressure difference was conspicuous 8 hours after the start of the reaction. In contrast, in case of the catalyst of Example 1 increase of the pressure difference was not observed even 10 hours after the start of the reaction whether the steam/naphtha ratio was 1.6, 1.3 or 1.1.

Performance Test 3

Catalysts prepared in Example 1, Comparative Example 2 and Comparative Example 5 were tested in the same manner as in Performance Test 1 except that naphtha having a final boiling point of 180° C. was employed, and the catalyst degradation speed was determined to obtain the following results.
Catalyst of Example 1: 4.3 mm/hr
Catalyst of Comparative Example 2: 7.8 mm/hr
Catalyst of Comparative Example 5: 12.0 mm/hr Performance Test 4

Catalysts prepared in Example 1, Comparative Example 2 and Comparative Example 5 were tested in the same manner as in Performance Test 1 except that the inlet temperature of the catalyst layer was changed to 350° C. When the reaction was conducted for 10 hours, the length of the reaction zone was measured to obtain the following results.
Catalyst of Example 1: 11 cm
Catalyst of Comparative Example 2: 20 cm
Catalyst of Comparative Example 5: 18 cm Performance Test 5

Thiophene was incorporated in an amount of 10 ppm as sulfur into naphtha (desulfurized), and sulfur poisoning of the catalyst was examined. The experiment conditions were the same as in Performance Test 1 except for the sulfur content (the sulfur content was below 0.1 ppm in naphtha in Performance Test 1). When the reaction was conducted for 10 hours, the length of the reaction zone was measured to obtain the following results.
Catalyst of Example 1: 4.2 cm
Catalyst of Comparative Example 2: 16 cm
Catalyst of Comparative Example 5: 14 cm

EXAMPLES 6 to 8

Catalysts having a composition indicated below were prepared in the same manner as described in Example 1 except that cerium or cerium and lanthanum were used instead of lanthanum.
Example 6:
 $NiO:CeO_2:Al_2O_3 = 70:10:20$ (weight ratio)
Example 7:
 $NiO:CeO_2:Al_2O_3 = 80:5:15$ (weight ratio)
Example 8:
 $NiO:Le_2O_3:CeO_2:Al_2O_3 = 70:10:5:15$ (weight ratio)

Performance Test 6

Catalysts prepared in Examples 6 to 8 were tested in the same manner as described in Performance Test 1 to obtain results shown in Table 2.

Table 2

| Example No. | Experiment Conditions | Length (cm) of Reaction Zone after 1 hour | Length (cm) of Reaction Zone after 10 hours | Catalyst Degradation Speed (mm/hr) |
|---|---|---|---|---|
| 6 | same as in Performance Test 1 | 2.3 | 3.0 | 0.8 |
| 7 | same as in Performance Test 1 | 2.0 | 3.0 | 1.1 |
| 8 | same as in Performance Test 1 | 2.6 | 3.7 | 1.2 |

EXAMPLE 9

A catalyst comprising 70% by weight of CoO, 10% by weight of $La_2O_3$ and 20% by weight of $Al_2O_3$ was prepared in the same manner as described in Example 1 except that cobalt nitrate was used instead of nickel nitrate.

EXAMPLE 10

A catalyst comprising 35% by weight of NiO, 35% by weight of CoO, 5% by weight of $La_2O_3$, 5% by weight of $CeO_2$ and 20% by weight of $Al_2O_3$ was prepared in the same manner as described in Example 1 except that nickel nitrate and cobalt nitrate were used instead of nickel nitrate and lanthanum nitrate and cerium nitrate were used instead of lanthanum nitrate.

Performance Test 7

By using the catalysts prepared in Examples 9 and 10, the degradation speed of the catalyst in the steam-reforming reaction was tested under the same conditions as in Performance Test 3 to obtain the following results.
Catalyst of Example 9: 5.2 mm/hr
Catalyst of Example 10: 4.5 mm/hr

Performance Test 8

The durability test was conducted on the catalysts prepared in Example 3 and Comparative Example 5 in the following manner.

A reaction tube having a diameter of 100 mm was packed with about 14 l of a pellet catalyst having a diameter of 4.75 mm and a height of 3.2 mm, and the reaction was carried out by using this packed reaction tube under the following conditions.
Reaction pressure: 8 atmospheres
Catalyst layer temperature: 480° C.
Mass velocity of feed naphtha: (final boiling point = 110° C.): 4880 kg/m².hr = 1000 lb/(ft)².hr
Steam/naphtha ratio: 2.0 (weight ratio)
$H_2$/naphtha ratio: 0.2 (mol ratio)

The relation between the reaction time and the point of completion of the reaction, observed with respect to each of the tested catalysts, was as shown in Table 3, from which it will readily be understood that the degradation speed in the binary catalyst of comparative Example 5 was much higher than that of the ternary catalyst of Example 3.

Table 3

| Reaction Time (hours) | Length (cm) of Reaction Zone Catalyst of Example 3 | Length (cm) of Reaction Zone Catalyst of Comparative Example 5 |
|---|---|---|
| 200 | 31 | 26 |
| 500 | 35 | 43 |
| 1000 | 39 | 51 |
| 2000 | 41 | 60 |

EXAMPLE 11 and 12

The catalysts having a composition, which are indicated below, were prepared in the same manner as described in Example 1.

| Example No. | $NiO : La_2O_3 : Al_2O_3$ (weight ratio) |
|---|---|
| 11 | 80 : 3 : 17 |
| 12 | 80 : 2 : 18 |
| Comparative Example 8 | 80 : 0.5 : 19.5 |

Performance Test 9

The catalysts prepared in Example 11 and 12, and Comparative Example 8 were tested in the same manner as described in Performance Test 1. The degradation speed of the catalysts was measured and shown below.
Catalyst of Example 11: 0.8 mm/hr
Catalyst of Example 12: 1.1 mm/hr
Catalyst of Comparative Example 8: 1.7 mm/hr

What is claimed is:

1. A catalyst material for use in production of methane-containing gases by reacting 2-12 carbon atom containing hydrocarbons with steam, consisting essentially of (A) 60 to 90% by weight of oxide of a first metal selected from the group consisting of nickel, cobalt and mixtures thereof, (B) 2 to 15% by weight of oxide of a second metal selected from the group consisting of lanthanum, cerium and mixtures thereof and (C) 5 to 30% by weight of aluminum oxide, said catalyst material being prepared by a process comprising:
   adding an aqueous solution of an alkaline substance to an aqueous solution of aluminum salt to form a first stage precipitate containing aluminum;
   adding an aqueous solution of the alkaline substance to a mixture of an aqueous solution of a second metal salt and said first stage precipitate to form a second stage precipitate containing second metal on said first stage precipitate;

adding an aqueous solution of the alkaline substance to a mixture of an aqueous solution of a said first metal salt and said second stage precipitate to form a third stage precipitate containing first metal on the second stage precipitate;

recovering the precipitate product resulting from said three stage operation; and converting said first and second metals and aluminum in said product to their oxides.

2. The catalyst of claim 1 wherein said first metal, second metal and aluminum salts are nitrates.

3. The catalyst of claim 1 wherein addition of first metal salt solution to the second stage precipitate is carried out while adjusting the pH in the resulting mixed solution to between about 6 to 10.

4. The catalyst of claim 1 wherein said precipitate product was washed, dried, pulverized and molded into predetermined shapes prior to said oxide converting step which comprised calcining the molded shapes.

5. A process for the production of catalyst material for use in the production of methane containing gases by reacting 2–12 carbon atom containing hydrocarbons with steam consisting essentially of (A) 60 to 90% by weight of oxide of a first metal selected from the group consisting of nickel, cobalt and mixtures thereof, (B) 2 to 15% by weight of oxide of a second metal selected from the group consisting of lanthanum, cerium and mixtures thereof and (C) 5 to 30% by weight of aluminum oxide, which comprises:

adding an aqueous solution of an alkaline substance to an aqueous solution of an aluminum salt to form a first stage precipitate containing aluminum, adding an aqueous solution of an alkaline substance to a mixture of an aqueous solution of a second metal salt and said first stage precipitate to form a second stage, second metal containing precipitate on said first stage precipitate, adding an aqueous solution of an alkaline substance to a mixture of an aqueous solution of a first metal salt and said second stage precipitate to form a third stage, first metal containing precipitate on said second stage precipitate, recovering the resulting precipitate product and converting said first and second metals and aluminum in said product to their oxides.

6. The process of claim 5 wherein said first metal, second metal and aluminum salts are nitrates.

7. The process of claim 6 wherein said alkaline substance is NaOH, KOH, $Na_2CO_3$, $K_2CO_3$ or $NH_4OH$.

8. The process of claim 5 wherein the final pH in said first stage is adjusted to between about 4.5 to 7, the final pH in said second stage is adjusted to above 6, the mixture of first metal salt solution and the second stage precipitate product is formed while adjusting the pH in the resulting mixed solution between about 6 to 10, and the final pH in said third stage is adjusted to between about 7 to 10.

9. The process of claim 5 wherein the conversion of the metals in said precipitate product is by calcining at a temperature between about 300° to 600° C.

10. The process of claim 9 wherein said precipitate product is washed, dried, pulverized and molded prior to calcining.

11. The process of claim 10 which further comprises subjecting the catalyst material to a reducing treatment in a hydrogen-containing gas under a pressure of about 1 to 100 atmospheres at about 300° to 600° C. for a time sufficient to convert first metal oxide in the catalyst to metallic first metal.

12. A process for the production of methane-containing gases comprising reacting hydrocarbon containing 2 to 12 carbon atoms with steam at about 300° to 600° C. at a hydrocarbon to steam weight ratio of between about 0.6 to 3 under a pressure of about 1 to 100 atmospheres in the presence of catalyst prepared by the process as defined in claim 11.

13. A catalyst material consisting essentially of a first metal selected from the group consisting of nickel, cobalt and combination thereof, a second metal selected from the group consisting of lanthanum, cerium and combination thereof, and aluminum oxide, said catalyst material being prepared by a process comprising:

adding an aqueous solution of an alkaline substance to a solution of an aluminum salt to form a first stage precipitate containing aluminum, adding an aqueous solution of the alkaline substance to a mixture of an aqueous solution of a salt of second metal and said first stage precipitate to form a second stage, second metal containing precipitate on said first stage precipitate, adding an aqueous solution of the alkaline substance to a mixture of an aqueous solution of a salt of first metal and the second stage precipitate to form a third stage, first metal containing precipitate on said second stage precipitate, recovering the resulting precipitate product consisting essentially of 60 to 90% by weight first metal oxide, 2 to 15% by weight second metal oxide and 5 to 30% aluminum oxide, converting the first and second metals and aluminum in said precipitate product to their oxides, and converting the oxides of the first and second metals in the converted product to metals in a reducing atmosphere at an elevated temperature.

* * * * *